Figure 9:
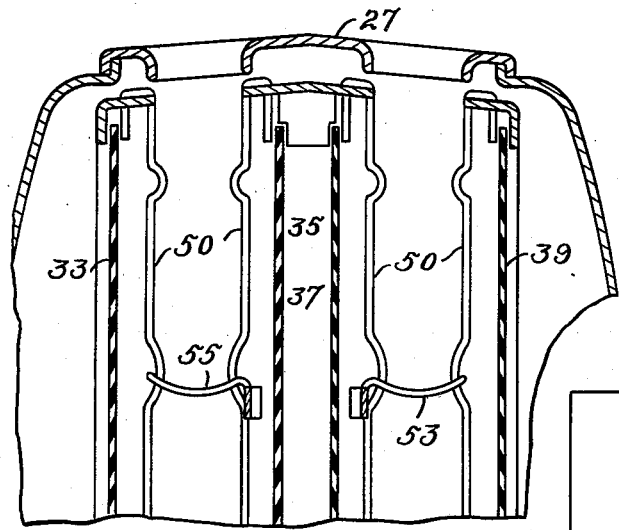

June 2, 1942. H. M. BIEBEL 2,285,141
AUTOMATIC ELECTRIC TOASTER
Filed April 10, 1941 3 Sheets-Sheet 1
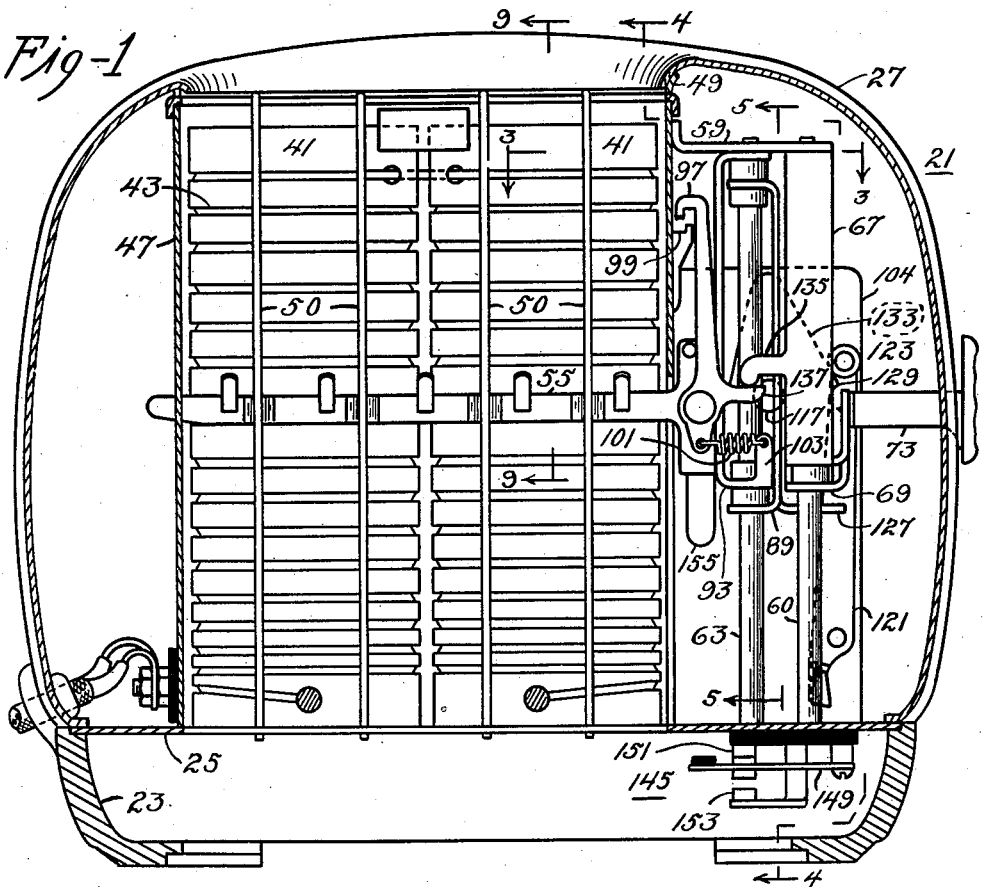
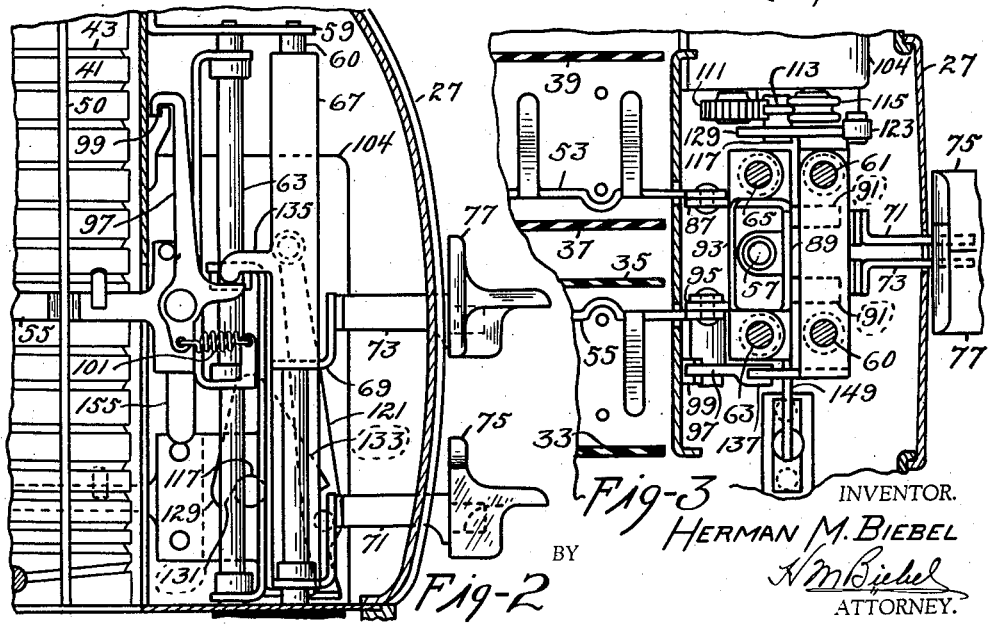
INVENTOR.
HERMAN M. BIEBEL
BY
ATTORNEY.

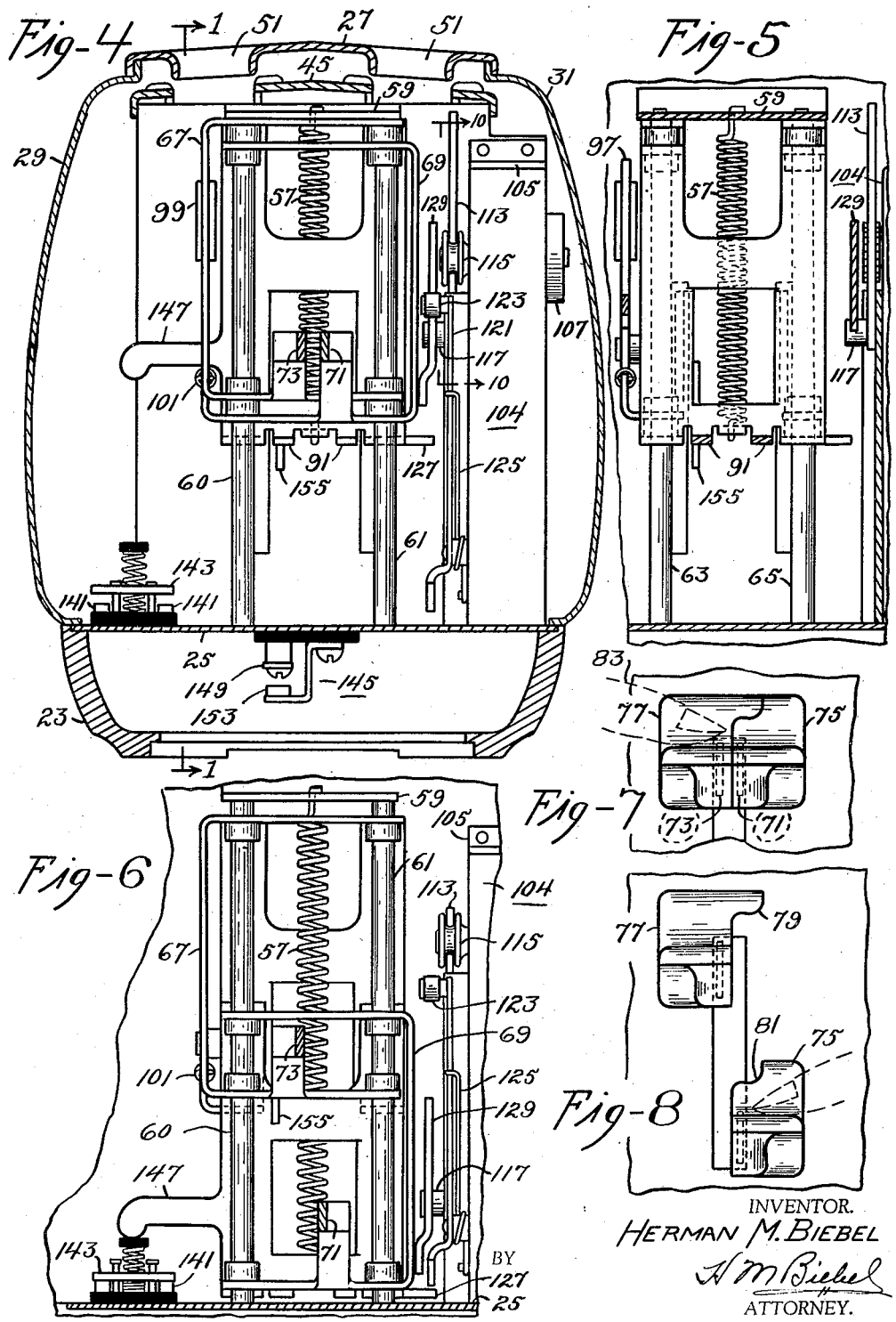

INVENTOR.
HERMAN M. BIEBEL
BY
ATTORNEY.

Patented June 2, 1942

2,285,141

UNITED STATES PATENT OFFICE 2,285,141

AUTOMATIC ELECTRIC TOASTER

Herman M. Biebel, Elgin, Ill., assignor to McGraw Electric Company, Elgin, Ill., a corporation of Delaware Application April 10, 1941, Serial No. 387,852

5 Claims. (Cl. 219—19)

My invention relates to electric cooking devices and particularly to plural-slice automatic electric toasters.

An object of my invention is to provide a two-slice electric toaster with means to ensure proper toasting of a single slice of bread at one time.

Another object of my invention is to provide a two-slice automatic electric toaster with means whereby a single slice of bread may be toasted at one time with attendant reduction in the amount of electric energy translated into heat for such toasting operation.

Another object of my invention is to provide a two-slice toaster having two bread carriers movable in their toasting chambers and having means for moving either a given bread carrier or both bread carriers in accordance with the number of slices of bread to be toasted simultaneously.

Other objects of my invention will either be apparent from a description of a form of device embodying my invention now preferred by me or will be specifically pointed out in the course of such description and set forth in the appended claims.

Figure 10:
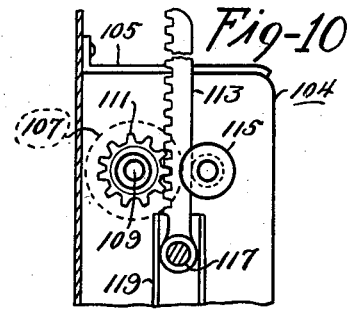
Figure 11:
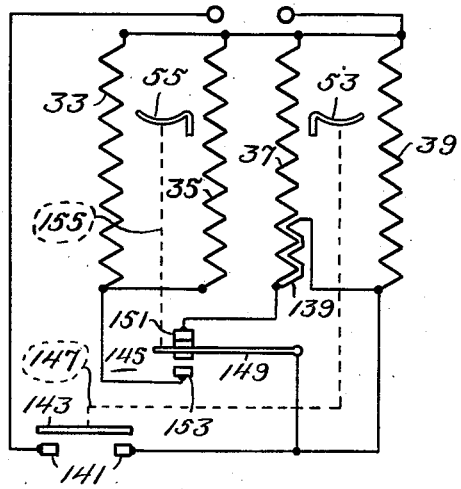
Figure 12:
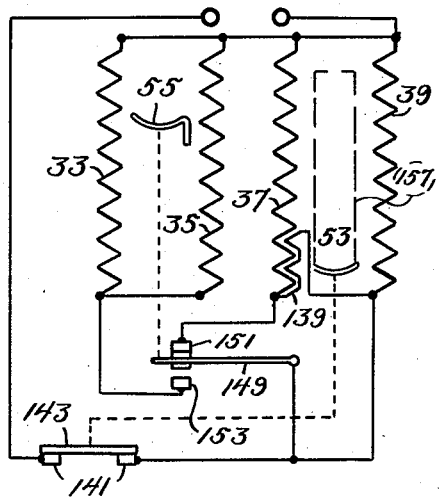
Figure 13:
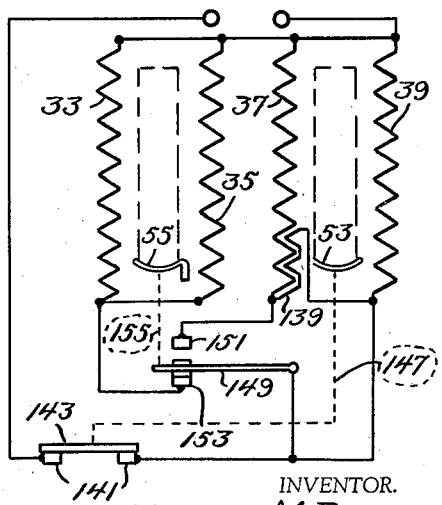

In the drawings,

Figure 1 is a longitudinal vertical sectional view taken on the line 1—1 of Fig. 4 through a toaster embodying my invention and showing the parts in non-toasting position, Fig. 2 is a fragmentary view similar to Fig. 1 showing certain parts in position when one slice of bread only is to be toasted, Fig. 3 is a fragmentary horizontal sectional view taken on the line 3—3 of Fig. 1, Fig. 4 is a vertical sectional view on the line 4—4 of Fig. 1 showing parts in non-toasting position, Fig. 5 is a vertical fragmentary sectional view taken on the line 5—5 of Fig. 1, Fig. 6 is a fragmentary view similar to Fig. 5 except that the parts are shown in the positions ready for toasting a single slice of bread, Fig. 7 is a fragmentary view showing the split interlocking operating knobs in their non-toasting position, Fig. 8 shows the knobs of Fig. 7 in non-interlocked position as when toasting a single slice of bread, Fig. 9 is a fragmentary vertical lateral section on the line 9—9 of Fig. 1 showing the relative position of certain parts of the toaster in their normal or non-operative position, Fig. 10 is a fragmentary sectional view on the line 10—10 of Fig. 4 to show the timer rack and pinion, Fig. 11 is a diagram of electric connections of a two-slice toaster when the parts are in non-toasting position as shown in Figs. 1, 4, 5 and 7, Fig. 12 is a diagram of connections similar to Figs. 11 except with the parts shown in position for toasting a single slice of bread only as shown in Figs. 2, 6 and 8, and, Fig. 13 is a diagram of connections similar to Fig. 11 except that the parts are shown in position for toasting two slices of bread simultaneously.

My invention is shown as applied to a substantially standard two-slice toaster 21 which includes a skeleton base frame 23 which may be made of moulded composition and which has a bottom plate 25 of thin sheet metal resting thereon and secured thereto in any desired suitable manner. The toaster includes an outer casing comprising a central portion 27 of substantially inverted U-shape and made of thin sheet metal as well as two side casing portions 29 and 31. While I have shown details of construction of the toaster base and outer casing, I do not desire to be limited thereto since they constitute no part of my invention.

I prefer to provide a plurality of planar vertical electric heating elements, two in number for each slice of bread to be toasted, and I have therefore shown a pair of heating elements 33 and 35 for the left-hand toasting chamber (as seen from the front of the toaster) and a second pair of spaced vertical heating elements 37 and 39 positioned in or constituting the side walls for the right-hand toasting chamber.

The respective heating elements may include one or more sheets 41 of thin electric insulating material such as mica, having wound thereon a resistor strand 43 of suitable current carrying material, all as well known in the art.

The bottom edges of the respective sheets of electric-insulating material may be held in properly spaced operative position by any means well known in the art and I may provide an upper or top frame plate 45 or a plurality of such frame plates to hold the upper edges of the respective heating elements. I provide further a rear intermediate wall 47 and a front intermediate wall 49 having their top edges properly interfitted with the top frame plate 45 and cooperating with the hereinbefore described planar heating elements to provide as many toasting chambers as may be desired, the number of such toasting chambers corresponding to the number of pairs of heating elements. Guard wires 50 may be provided in a manner well known in the art.

The central portion 27 of the outer casing may be provided with bread-inserting and toast-removing apertures 51 to permit of inserting a slice or slices of bread into the toaster or of removing them therefrom when toasted.

I provide further a pair of bread carriers 53 and 55 positioned respectively in the right-hand toasting chamber and in the left-hand toasting chamber. These bread carriers have rear and front portions extending through and movable in slots in the rear intermediate plate and the front intermediate plate, all as well known in the art.

The two bread carriers are normally yieldingly biased into upper or non-toasting position by a tension spring 57 which may have its upper end connected with a bracket member 59 and its lower end connected to a member to be hereinafter described in detail.

Means for permitting vertical movement of the bread carriers as required to toast a slice or slices of bread include a plurality of vertical standards, there being two pairs of such vertical standards 60 and 61 positioned in front of a second pair of vertical standards 63 and 65. These standards may have their lower ends properly interfitting with the bottom plate 25 and may have their upper ends interfitting with the bracket 59 hereinbefore mentioned. The front pair of vertical standards 60 and 61 have vertically movably mounted thereon a pair of U-shaped members 67 and 69. These U-shaped members have substantially horizontally extending portions having apertures therein to permit of mounting them on the vertical standards 60 and 61, the relative position of these two members on the vertical standards being such that member 69 may be moved downwardly from its normal upper position without moving the member 67, as may be desired under certain operating conditions.

Means for causing movement of either member 69 alone or of both members 67 and 69 simultaneously include a forwardly extending projection 71 secured to member 69 and a similar forwardly extending projection 73 secured to member 67 and positioned at the left of member 71 relatively adjacent thereto, both members 71 and 73 extending outwardly through slots in the central casing portion 27 at its front part. Projection 71 has a knob 75 secured thereto outside of the casing and projection 73 has a knob 77 mounted thereon outside of the casing, the shape of these two knobs being such that normally they are interlocked with each other by reason of the fact that the left-hand knob 77 has a lug 79 at its top extending laterally and to the right thereof to interfit with a recess 81 in knob 75, all as may be seen by reference to Figs. 7 and 8. Pressure by an operator's finger 83 on either the right-hand knob 75 or the left-hand knob 77 will respectively cause downward movement of knob 75 alone with attendant downward movement of member 69 or of both knobs 77 and 75 and downward movement of both members 67 and 69 with attendant results to be now described.

The right-hand carrier 53 has its front end portion mechanically connected to a rearwardly projecting part 87 which is a part of a front carriage plate 89 having upper and lower rearwardly projecting portions having apertures therein whereby they may be mounted on and moved vertically relatively to the rear pair of standards 63 and 65. Carriage 89 is provided also with a pair of forwardly projecting portions 91 adapted to extend under the lower horizontal portion of member 69 hereinbefore described so that downward movement of member 69 as by pressure of an operator on knob 75 will also cause downward movement of carriage 89 and the right-hand carrier 53 secured thereto.

I provide a second carriage plate 93 having a plurality of upper and lower forwardly extending portions having apertures therein for mounting the carriage 93 on the pair of vertical standards 63 and 65 to permit of vertical movement of the carriage on the standards. Carriage 93 is provided with a rearwardly extending portion 95 to which the front end portion of the left-hand carrier 55 is secured so that movement of carriage 93, under certain operating conditions, will cause simultaneous movement of left-hand carrier 55.

Left-hand bread carrier 55 is normally held in its upper nontoasting position by the action of a hook member 97 (see Figs. 1 and 2) pivotally mounted on the front end portion of carrier 55 and normally yieldingly biased into a position to engage with a projection 99 secured to the front intermediate wall 49, the arm 97 being normally yieldingly biased into its position in a counter-clockwise direction by a short tension spring 101 having one end thereof connected to a lower end portion while the other end of spring 101 is connected to a lug 103 constituting a part of rear carriage 93 and located thereon at its lower left-hand corner portion.

I provide a mechanical timer 104 of the kind disclosed and claimed in Ireland Patent No. 1,866,808 to which reference may be made for details of construction and operation thereof and this timer may be held in proper operative position by a bracket 105 secured to the front intermediate wall 49.

Certain of the drawings, such as Figs. 1 and 2, do not show certain details for which reference may be had to Fig. 10 of the drawings. The timer 104 includes a clock spring 107 mounted on an arbor 109 which also has a pinion 111 fixedly mounted thereon. This pinion is adapted to mesh with a rack bar 113 vertically movable relatively to the timer and the pinion 111, it being movable downwardly by means to be hereinafter described to wind the clock spring 107 and being movable vertically upwardly upon unwinding of said spring during operation of the toaster. The rack bar 113 is held in mesh with pinion 111 by a grooved roller 115. A pin 117 is secured to the lower end of rack bar 113 which lower end may move in a track or guide 119 of substantially channel shape in lateral section, as desired.

The timer is provided also with a detent lever 121 pivotally mounted at one side of the timer structure, this detent lever having a pin or lug 123 at its upper end and being normally yieldingly biased in a counter-clockwise direction by a light spring 125, all as now well known in the art.

The forward carriage 89 is provided with a right-hand projection 127 adapted to fit underneath the lower end of detent lever 121 to thereby hold either the right-hand bread carrier 53 in toasting position or to hold both bread carriers in toasting position during a toasting operation.

The right-hand member 69 of U-shape is provided with a member 129 secured thereto as shown more particularly in Fig. 4 of the drawings, which member, of substantially inverted U-shape, has a recess 131 therein at its bottom portion into which pin 117 on the lower end of rack bar 113 is adapted to fit whereby downward movement of member 69 and member 129 will cause downward movement of the rack and winding up of the timer spring 107. Member 129 is provided also with an angularly extending upper surface 133 adapted to engage pin 123 on the upper end of lever arm 121 whereby to cause releasing turning movement of detent lever arm 121, all as now well known in the art. Thus if the operator presses downwardly on knob 75, member 69 and member 129 secured thereto will be moved downwardly with attendant winding up of the mechanical timer 104, carriage 89 and the right-hand carrier 53 being also moved downwardly simultaneously to move the bread carrier from its normal non-toasting position into its toasting position. As soon as the operator releases his pressure on knob 75 after having pressed carriage 89 downwardly far enough to cause projection 127 to engage with the lower end portion of the detent lever arm 121, the spring 107 will be permitted to unwind with attendant slow upward movement of the rack bar 113, the pin 117 thereon causing simultaneous upward movement of members 69 and 129 and the knob 75 until at the end of a toasting operation, the length of which is determined by the timer 104, the detent lever arm 121 is moved to release the carriage 89 from its lower position with quick upward return thereof by reason of the spring 57.

Let it now be assumed that the operator desires to toast two slices of bread simultaneously, in which case he will press upon knob 77 causing simultaneous downward movement of member 67 as well as member 69. Member 67 is provided with a rear projection 135 adapted to engage a forwardly projecting portion 137 constituting a part of member 97. The first result of this engagement of member 135 with member 137 is that arm 97 is moved in a clockwise direction whereby it will be moved out of engaging position with stop 99 after which further pressure on knob 77 will cause downward movement of members 67, 69, 89, 93 and the carriers 53 and 55 secured to the carriages 89 and 93. This will therefore cause movement of both bread carriers into toasting position.

I have found that heating elements 33 and 39 must have a slightly greater wattage capacity than the inner heating elements 35 and 37 in those cases where two slices of bread are to be toasted simultaneously. However, when a single slice of bread is to be toasted alone as, say, in the right-hand toasting chamber enclosing carrier 53, I find that the wattage of heater 37 must be slightly increased in order to compensate for the heat normally provided by adjacent inner heater 35. For this purpose I make 37 in two sections so connected that when two slices of bread are toasted, an auxiliary small portion 139 is in electric energizing circuit but is cut out when a single slice of bread only is toasted.

In order to control the energization of right-hand inner heater 37 and of the pair of heaters 33 and 35, I provide a main switch including fixed contact member 141 and a contact bridging member 143 as well as an auxiliary heater control switch 145. Contact members 141 are insulatedly mounted on bottom plate 25 and contact bridging member 143 is also supported on bottom plate 25 but normally biased out of engagement with fixed contact members 141 but adapted to be moved into engagement therewith by a left-hand projection 147 constituting a part of carriage 89 and projecting therefrom at its left-hand side. It is thus evident that the main heater control switch including members 141 and 143 will be closed by downward movement of knob 75 when one slice of bread is to be toasted.

Auxiliary heater control switch 145 includes a contact arm 149 normally yieldingly biased into engagement with a fixed contact member 151 but adapted to be moved out of engagement with said contact and downwardly into engagement with a lower contact member 153, contact arm 149 and contact members 151 and 153 being insulatedly mounted on and adjacent to the bottom face of plate 25. Means for operatively engaging contact arm 149 includes a depending bar 155 secured to left-hand carrier 55. It is thus evident that when only a single carrier, namely the right-hand carrier 53, is moved downwardly, the auxiliary heater control switch 145 will remain in the position shown in Figs. 11 and 12 where, as shown by the diagram of connections in these figures, the left-hand pair of toast heating elements 33 and 35 will not be energized and the auxiliary heater portion 139 of the inner heater 37 will also not be energized whereby a slice of bread positioned on the right-hand carrier 53 as shown by the broken lines 157 (see Fig. 12) to indicate a slice of bread, will have both sides toasted to the same degree of brownness.

However, when two slices of bread as shown in Fig. 13 have been placed upon the two carriers, which have been moved downwardly into toasting position as hereinbefore described, member 155 will have engaged contact arm 149 with attendant downward movement thereof into engagement with contact 153 whereby, as shown by the diagram of Fig. 13, all of the toast heating elements 33, 35, 37 and 39 will be energized, it being noted that auxiliary section 139 of heater 37 is also energized.

The device embodying my invention thus provides relatively simple means including more particularly two interlocked actuating knobs on the outside of a toaster casing whereby an operator can cause energization of only those heaters operatively associated with a certain bread carrier to cause proper toasting of the two sides of a single slice of bread or by downward movement of a second actuating knob interlocked with the first actuating knob he may cause downward movement of both bread carriers with attendant change in electrical circuit connections to cause proper toasting of both sides of both slices of bread, it being understood that the timer determining the length of a toasting operation is operative in either case. While I have shown a mechanical timer, it is to be understood that any other timer may be used in place thereof.

While I have shown a specific embodiment of my invention, I desire it to be understood that all modifications thereof coming clearly within the scope of the appended claims shall be considered to be covered thereby.

I claim as my invention:

1. In a two-slice automatic electric toaster comprising a plurality of toast heating elements for each slice of bread to be toasted, a first and a second bread carrier movable into toasting and non-toasting positions relatively to the heating elements and normally biased into non-toasting position, means for selectively moving said first carrier alone or both carriers into toasting position, a normally open main heater switch controlling all of said toast heating elements, means for causing closing of said main heater switch when said first carrier is moved into toasting position, an auxiliary switch controlling the energization of less than all of said toast heating elements and normally yieldingly biased into position to prevent energization of the toast heating elements for the second carrier when the main switch is closed, and means on said second carrier to cause movement of said auxiliary switch into another position to cause energization of the heating elements for the second carrier when both said carriers are simultaneously moved into toasting position and said main switch is closed by said first carrier.

2. A two-slice automatic electric toaster comprising electric toast heating elements, a first and a second bread carrier movable into toasting and non-toasting positions relatively to the toast heating elements and biased into non-toasting position, a main switch controlling all of said toast heating elements normally biased into open position, an auxiliary switch controlling the heating elements associated with the second carrier and normally yieldingly biased into position to prevent the energization of the heating elements associated with the second carrier, means on said carriers to selectively cause movement of said first carrier alone or both said carriers simultaneously into toasting position, movement of said first carrier alone into toasting position causing closing of said main switch and the retention of its normal position by the auxiliary switch and simultaneous movement of both carriers into toasting position causing closing of said main switch and movement of said auxiliary switch to a position to cause energization of the heating elements associated with the second carrier.

3. In a two-slice automatic toaster comprising toast heating elements, a first and a second bread carrier unattached to each other, movable into toasting and non-toasting positions relatively to the toast heating elements and normally yieldingly biased into non-toasting position, a main switch controlling the energization of all said heating elements and normally yieldingly biased into open position, the improvement comprising means on each of said carriers to cause movement thereof into toasting position, pressure on the means on said first carrier causing movement of said first carrier only and pressure on the means on said second carrier causing movement of both said carriers, an auxiliary switch controlling less than all of said heating elements and normally yieldingly biased into position to deenergize certain of said heating elements, downward movement of said first carrier causing closing of said main switch and energization of only those heating elements required to properly toast a slice of bread on said first carrier and downward movement of both said carriers causing closing of said main switch and movement of said auxiliary switch to effect proper energization of the heating elements required to toast slices of bread placed on the first and on the second carrier.

4. A two-slice automatic electric toaster comprising toast heating means for each of said slices, a first and a second bread carrier unattached to each other movable into toasting and non-toasting positions relatively to said toast heating elements and normally yieldingly biased into non-toasting position, a plurality of switches controlling said toast heating elements and adapted to be controlled by said carriers when the latter are moved into toasting position, a first and a second knob interengaged with each other and connected respectively with said first and said second carrier, downward pressure on said first knob causing downward movement of said first knob and carrier, movement of said first switch only and energization of the toast heating elements for said first carrier and slice of bread and pressure on said second knob causing downward movement of both knobs and carriers and movement of both switches into respective positions to cause energization of the toast heating elements for both slices of bread and carriers.

5. An automatic electric two-slice toaster comprising toast heating elements for each of said slices, a first and a second bread carrier unattached to each other movable into toasting and non-toasting positions relatively to the toast heating elements and normally yieldingly biased into non-toasting position, latch means normally holding said second carrier in non-toasting position, a first carriage connected with said first carrier, a second carriage connected with said second carrier and having means thereon to release said latch means, an actuating knob on each of said carriages, a normally open main switch and an auxiliary switch controlling said toast heating elements and electric connections between said switches and said toast heating elements to cause downward pressure on the knob mounted on said first carriage to effect downward movement of said first carrier alone, closure of said main switch and retention of the auxiliary switch in position to cause energization of the toast heating elements only for said first bread carrier and to cause downward pressure on the knob mounted on the second carrier to effect simultaneous downward movement of both carriers, closure of said main switch and movement of the auxiliary switch into position to cause energization of all of said toast heating elements.

HERMAN M. BIEBEL.